Patented Jan. 11, 1944

2,339,056

UNITED STATES PATENT OFFICE 2,339,056

POLYVINYL ACETAL RESIN COMPOSITION

John K. Craver, Affton, Mo., assignor to Monsanto Chemical Company, St. Louis, Mo., a corporation of Delaware No Drawing. Application June 9, 1941,
Serial No. 397,211

14 Claims. (Cl. 260—36)

The present invention relates to polyvinyl acetal resins and particularly to plastic compositions embodying said resins and mixtures of plasticizers. The invention also relates to safety glass and films of such plastic compositions which are suitable interlayers for safety glass.

The principal object of the present invention is to provide a plastic composition embodying a polyvinyl acetal resin which, besides possessing the desirable properties of the polyvinyl acetal resin as a safety glass interlayer, is characterized by increased flexibility, particularly at low temperatures, excellent adhesion to glass, and great stability. Other objects and advantages of the invention, some of which are referred to hereinafter, will be apparent to those skilled in the art to which this invention pertains.

I have discovered that polyvinyl acetal resins are unexpectedly improved in various characteristics, especially those desired in interlayer films for safety glass manufacture, by incorporating or embodying in plastic compositions comprising such resins, a mixture of plasticizers of certain specific types in certain specified proportions. Films of plastic compositions containing such mixed plasticizers in the specified proportions are characterized by great rubberiness or "nerve," by excellent adhesion to glass, and by greater flexibility at low temperatures than was heretofore thought possible to attain in such plastic compositions.

The mixed plasticizer which I have found to produce these results consists of two components, one of which is an alkylamide, each amino nitrogen group of which is completely substituted by alkyl groups, and the other is an alkyl ester of an aliphatic carboxylic acid. The alkylamide, which I refer to as the basic or primary plasticizer, is a solvent plasticizer that is compatible with the polyvinyl acetal resin. The alkyl ester of the aliphatic carboxylic acid, which is the auxiliary or secondary plasticizer, is, by comparison, a plasticizer that is incompatible with and is a non-solvent for the polyvinyl acetal resin.

Heretofore, in making plastic compositions from polyvinyl acetal resins many mixtures of plasticizers were tried. It has been generally believed that if a plasticizer that was embodied in the resin gave a film or sheet that was lacking in flexibility at low temperatures, one should add an auxiliary plasticizer that was more compatible with the resin and that was as good or a better solvent for the resin. Thus, if the alkylamides specified in the present invention did not give a film of sufficient flexibility, the art teaches that one should add an auxiliary plasticizer that is as good or perhaps a better solvent for the resin and that is also more or equally as compatible with the resin as the alkylamide. However, I have found, on the contrary, that this rule does not apply to the compositions of the present invention. To improve the flexibility of a polyvinyl acetal resin plasticized with an alkylamide, I add, according to this invention, an auxiliary plasticizer that is a poorer solvent and that is less compatible than the alkylamide. Not only is the flexibility at low temperatures improved considerably in this manner, but I have been able to provide compositions that are more flexible than any heretofore produced by the use of any plasticizer or mixture of plasticizers and this without sacrifice of other eminently desirable properties.

The alkylamides whose use is contemplated in the present invention conform to the following general formula:

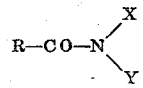

in which R represents an alkyl group containing from 5 to 17 carbon atoms, and preferably 11 to 17 carbon atoms, and X and Y represent the same or different alkyl groups having from 1 to 18 carbon atoms, and preferably 4 to 8 carbon atoms. The compounds may also be of the form in which one or both of the alkyl groups X and Y are replaced by the residue of cyclohexylamine, or in which both X and Y are replaced by the residue of morpholine or piperidine, as in the following formulae:

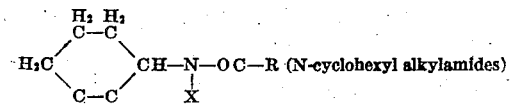

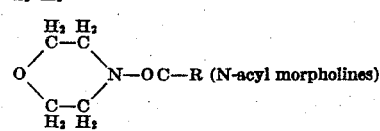

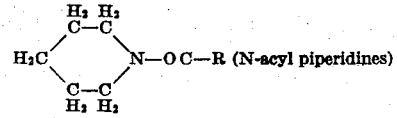

The compounds may also be derived from diamides of dicarboxylic acids or similar compounds as represented by the following formulae:

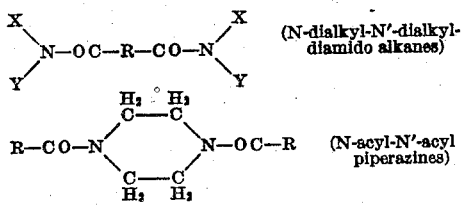

Examples of alkylamides are those in which X and Y of the above general formula are methyl, ethyl, propyl, butyl, amyl, hexyl, heptyl, octyl, nonyl, decyl, undecyl, dodecyl, tridecyl, tetradecyl, pentadecyl, hexadecyl, heptadecyl, octadecyl or cyclohexyl radicals or ethylene glycol monoether radicals such as

or glycerol ether radicals such as

or the like and the group R—CO— is a pentanoyl (valeryl and isomeric acids), hexanoyl (caproyl, etc.) heptanoyl (oenanthyl, etc.), octoyl (caprylyl, etc.), nonoyl (pelargonyl, etc.), decanoyl (capryl, etc.), undecanoyl, dodecanoyl (lauryl, etc.), tridecanoyl, tetradecanoyl (myristyl, etc.), pentadecanoyl, hexadecanoyl (palmityl, etc.), heptadecanoyl, or octadecanoyl (stearyl, etc.) radical.

Alkylamides in which one of the groups X or Y as disclosed in the above general formula is hydrogen, for example, N-monobutyl lauramide, exhibit little effectiveness when used in the compositions of this invention because of their incompatibility with the polyvinyl acetal resin.

Preferred alkylamides for use in this invention as primary plasticizers are N-dibutyl lauramide, N-dibutyl stearamide, N-dibutyl palmitamide, N-dibutyl myristamide, N-dihexyl lauramide, N-dimethyl stearamide, N-dicyclohexyl lauramide, N-lauroyl morpholine, N-lauroyl piperidine and N,N'-dilauroyl piperazine.

The alkyl esters of aliphatic carboxylic acids which may be used in conjunction with the alkylamides are those in which the alkyl group derived from the acid has from 11 to 17 carbon atoms and the alkyl group derived from the alcohol has from 1 to 18 carbon atoms, and preferably 2 to 8 carbon atoms. Thus, the esters may be represented by the general formula:

X—O—OC—Y in which X, which represents the alkyl group derived from the alcohol, has from 1 to 18 carbon atoms and Y, which represents the alkyl group derived from the acid, has from 11 to 17 carbon atoms. The acids may be polycarboxylic acids in which event less than 11 and as low as 2 carbon atoms may be present in the alkyl group derived from the acid, for example, as in di-n-octyl succinate,

C₈H₁₇—OOC—CH₂—CH₂—OOC—C₈H₁₇ which corresponds to the general formula:

X—OOC—R—COO—X in which R, the alkylene group derived from the acid, may have from 2 to 16 carbon atoms and X, the alkyl groups derived from alcohols, may have from 4 to 18 carbon atoms.

Preferred alkyl esters of aliphatic carboxylic acids for use in this invention as auxiliary plasticizers are methyl stearate, butyl stearate, butyl myristate, ethyl stearate, butyl palmitate, butyl laurate, di-n-octyl succinate and di-n-octyl sebacate.

The mixed plasticizers specified herein are especially effective when used with polyvinyl butyraldehyde acetal resins, that is, resins such as are obtained by the condensation of a partially hydrolyzed polyvinyl ester with butyraldehyde, and are of less effectiveness with polyvinyl formaldehyde acetal resins, although they are of value with these and polyvinyl acetal resins in general. The preparation of such polyvinyl acetal resins is disclosed in various patents, for example, in Morrison, Skirrow and Blaikie, U. S. Patent No. 2,036,092, Kuhn and Hopff, U. S. Patent No. 2,044,730 and in French Patent No. 793,175. The polyvinyl acetal resins may consist of mixed acetal resins, that is, those produced by condensation of two or more aldehydes with polyvinyl alcohol or a partially hydrolyzed polyvinyl ester.

The relative proportions of the alkylamide primary plasticizer and alkyl ester auxiliary plasticizer that are used in admixture with each other to provide the advantageous results described in this invention are generally within the range of 20% to 80% by weight of alkylamide to 80% to 20% by weight of alkyl ester. The preferred range, however, is 40% to 60% by weight of alkylamide and 60% to 40% by weight of alkyl ester, and best results are produced generally at about 50% by weight of each. Of course, there are variations from this optimum proportion, dependent upon the particular primary alkylamide and the particular auxiliary alkyl ester plasticizer present in the particular mixture.

The following results illustrate the variation in flexibility (expressed as "bends at —20° F." which is defined hereinafter) produced by varying the ratio of alkylamide primary plasticizer and alkyl ester auxiliary plasticizer. In these tests N-dibutyl lauramide (DBL) was the primary plasticizer and butyl stearate (BS) was the auxiliary plasticizer and the films consisted of 50 parts of the mixed plasticizer and 100 parts of polyvinyl butyraldehyde acetal ("Butvar") resin:

| Percentage composition of plasticizer | Bends at —20° F. |
|---|---|
| 20% BS—80% DBL | 610 |
| 40% BS—60% DBL | >4,000 |
| 50% BS—50% DBL | >4,000 |
| 60% BS—40% DBL (incompatible mixture) | 280 |

The proportion of the mixed plasticizer which is embodied in the polyvinyl acetal resin to produce rubbery sheets is likewise variable. Generally at least 20 parts by weight of the mixed plasticizer per 100 parts by weight of the resin are desirable but at least 30 parts by weight are necessary to provide a rubbery sheet and I prefer to use about 50 parts of mixed plasticizer to each 100 parts of the resin. However, proportions greatly in excess of 100 parts by weight of mixed plasticizer to 100 parts by weight of resin begin to show an absence of rubberiness or "nerve." For practical purposes, therefore, where the composition is to be used as an interlayer film in safety glass the desirable range is from 20 to 150 and preferably 40 to 100 parts by weight of the mixed plasticizer per 100 parts by weight of the resin. The proportion of plasticizer will also be limited by the extent of compatibility with the resin.

The mixed plasticizer is compounded or incorporated with the resin in conventional manner. Thus, it may be incorporated by simple kneading in a mixer, either while cold or preferably with the aid of heat. Mutual solvents may be used to facilitate the incorporation although this is a less preferable method since solvent must be expelled from the final composition. After the incorporation of the plasticizer and other ingredients, which may include stabilizers, other plasticizers, coloring agents and the like, the composition may be cast into forms or sheets in conventional manner.

Examples of preferred compositions of my invention are as follows. In all of these examples the resin used was a polyvinyl acetal resin sold under the trade-name "Butvar," which consists of a condensation product of butyraldehyde with a partially hydrolyzed vinyl ester polymer.

Example 1

Twenty-five (25) parts by weight of butyl palmitate and 25 parts by weight of N-dibutyl lauramide are mixed together by kneading with 100 parts by weight of "Butvar" resin. The composition is then cast into the form of a film having a thickness of about 0.0325 inch by pressing in a mold under pressure. This is composition No. 30 in the tables hereinafter.

Example 2

Ten (10) parts by weight of butyl stearate and 40 parts by weight of N-dibutyl lauramide are kneaded together with 100 parts by weight of "Butvar" resin and cast into films having a thickness of about 0.0325 inch. This is composition No. 23 in the tables hereinafter.

Example 3

Twenty (20) parts by weight of butyl stearate and 30 parts by weight of N-dibutyl lauramide are kneaded together with 100 parts by weight of "Butvar" resin and cast into films having a thickness of about 0.0325 inch. This is composition No. 24 in the tables hereinafter.

Example 4

Twenty-five (25) parts by weight of ethyl stearate and 25 parts by weight of N-dibutyl lauramide are kneaded together with 100 parts by weight of "Butvar" resin and cast into films having a thickness of about 0.0325 inch. This is composition No. 25 in the tables hereinafter.

The properties of the films or sheets prepared in the foregoing examples are described hereinafter. Various additional compositions and comparison compositions which should also be noted are those disclosed in the tables hereinafter. They were made according to the manner exemplified in the foregoing examples and their compositions are set forth in tabular form. In all of these compositions the parts of the various plasticizers represent parts by weight that were embodied in 100 parts by weight of "Butvar" resin.

The flexibilities of the films prepared as described in the foregoing examples and those prepared for comparison were determined by cooling a film having a thickness of about 0.020 inch to −20° F. (−29° C.) and, while maintaining it at such temperature, subjecting it to continual bending across one fold of the film until it broke. The number of bends, each bend consisting of a complete fold through an angle of 180° and back to the original position, which were required to break the respective films are shown in the tables which follow, under the heading "Bends at −20° F."

| No. | Plasticizer per 100 parts "Butvar" | Bends at −20° F. |
|---|---|---|
| 1 | 50 parts dibutyl phthalate | 220 |
| 2 | 50 parts triacetin (glyceryl triacetate) | 250 |
| 3 | 50 parts tripropionin (glyceryl tripropionate) | 250 |
| 4 | 50 parts ethylene glycol dioctoate | 1,120 |
| 5 | 50 parts di-n-octyl succinate | 820 |
| 6 | 50 parts di-2-ethylhexyl thiodiglycolate | 776 |
| 7 | 50 parts dibutyl sebacate | 780 |
| 8 | 50 parts triethylene glycol dihexoate | 835 |
| 9 | 50 parts decanoyl butyl glycolate | 1,155 |
| 10 | 50 parts butyl phthalyl butyl glycolate | 45 |
| 11 | 50 parts butyl succinyl butyl glycolate | 3,500 |
| 12 | 50 parts lauroyl piperidine | 196 |
| 13 | 50 parts lauroyl morpholine | 70 |
| 14 | 50 parts N-dicyclohexyl lauramide | 20 |
| 15 | 50 parts N-dibutyl lauramide | 370 |
| 16 | 50 parts N-dihexyl lauramide | 395 |
| 17 | 50 parts N-dibutyl palmitamide | 540 |
| 18 | 25 parts decanoyl butyl glycolate (compatible). 25 parts N-dibutyl lauramide | 865 |
| 19 | 25 parts butyl phthalyl butyl glycolate (compatible). 25 parts N-dibutyl lauramide | 175 |
| 20 | 25 parts dibutyl phthalate (compatible). 25 parts N-dibutyl lauramide | 175 |
| 21 | 25 parts ethylene glycol dioctoate (compatible). 25 parts N-dibutyl lauramide | 420 |
| 22 | 25 parts dibutyl phthalate (compatible). 25 parts butyl laurate (incompatible) | 1,090 |
| 23 | 10 parts butyl stearate (incompatible). 40 parts N-dibutyl lauramide | 610 |
| 24 | 20 parts butyl stearate (incompatible). 30 parts N-dibutyl lauramide | >4,000 |
| 25 | 25 parts butyl stearate (incompatible). 25 parts N-dibutyl lauramide | >4,000 |
| 26 | 30 parts butyl stearate. 20 parts N-dibutyl lauramide (mixture incompatible). | 280 |
| 27 | 25 parts dilauryl phthalate (incompatible). 25 parts N-dibutyl lauramide | 360 |
| 28 | 25 parts butyl laurate (incompatible). 25 parts N-dibutyl lauramide | 1,188 |
| 29 | 25 parts butyl myristate (incompatible). 25 parts N-dibutyl lauramide | 1,424 |
| 30 | 25 parts butyl palmitate (incompatible). 25 parts N-dibutyl lauramide | >4,000 |
| 31 | 25 parts ethyl stearate (incompatible). 25 parts N-dibutyl lauramide | >4,000 |
| 32 | 25 parts ethylene glycol dilaurate (incompatible). 25 parts N-dibutyl lauramide | 1,960 |

In the foregoing all the plasticizers, except in composition No. 26, were compatible with the "Butvar" resin in the proportions used. There was no clouding of the film or exudation of the plasticizer except in the case of composition No. 26. In the above table the designations "compatible" or "incompatible" following the name of the compound were added to designate that the compound was compatible or incompatible with "Butvar" resin when used alone, with no other plasticizer, in the proportion of 50 parts by weight to 100 parts by weight of "Butvar."

It will be seen by comparison of the various compositions in the table that

1. Mixing of a compatible plasticizer with N-dibutyl lauramide, another compatible plasticizer, within the ranges specified, produces no increase in flexibility over that which would be expected from the mixture. Compare No. 1, 15 and 20; also No. 9, 15 and 8; No. 10, 15 and 19; and No. 4, 15 and 21. N-butyl lauramide, which is the compatible plasticizer in all these compositions is improved in some cases at the expense of the other plasticizer and itself improves some of the plasticizers of low flexibilizing power, but the improvement is approximately that expected from the mean of the two flexibility values.

2. Mixing of a compatible primary alkylamide with an incompatible auxiliary alkyl ester plasticizer as specified in this description produces an increase in flexibility exceeding that of the alkylamide. Compare, for example, the flexibility of compositions No. 27, 28, 29, 30, 31 and 32 with the flexibility value for No. 15, which is N-dibutyl lauramide without the incompatible plasticizer.

3. Decreasing the proportion of alkylamide primary plasticizer produces an increase in the flexibility of a composition containing an incompatible alkyl ester plasticizer up to a certain point, after which flexibility decreases. Compare the flexibility of compositions No. 23, 24, 25 and 26. Note that the plasticizer mixture is incompatible in No. 26.

4. With two similar compounds, ethylene glycol dioctoate (No. 4) and ethylene glycol dilaurate, the first of which is compatible and the other of which is incompatible with "Butvar", admixture of N-dibutyl lauramide produces a decrease in the flexibility (see No. 21) below that of either the N-dibutyl lauramide or ethylene glycol dioctoate alone, while with the incompatible compound (see No. 32), an increase in flexibility is produced.

In the following table are listed the relative volatilities of various plasticizers and plasticizer mixtures from "Butvar" sheets, expressed as "Per cent loss after 168 hours at 105° C." In determining this loss the films heretofore prepared, embodying 50 parts by weight of plasticizer or plasticizer mixture in 100 parts of "Butvar" resin, were allowed to stand in an oven maintained at 105° C. for 168 hours, during which period the loss in weight, which was considered as loss of plasticizer by volatilization, was determined. The numbers in the first column refer to those which were given the particular composition in the preceding flexibility table.

| No. | Plasticizer per 100 parts "Butvar" | Loss after 168 hours at 105° C. |
|---|---|---|
| | | Per cent |
| 1 | 50 parts dibutyl phthalate | 94.5 |
| 4 | 50 parts ethylene glycol dioctoate | 100 |
| 7 | 50 parts dibutyl sebacate | 72 |
| 8 | 50 parts triethylene glycol dihexoate | 81.5 |
| 9 | 50 parts decanoyl butyl glycolate | 97 |
| | 50 parts N-dibutyl palmitamide | 15 |
| 17 | 50 parts N-dibutyl stearamide | 11.7 |
| 21 | 25 parts ethylene glycol dioctoate / 25 parts N-dibutyl lauramide | 78 |
| 25 | 25 parts butyl stearate / 25 parts N-dibutyl lauramide | 71 |
| 29 | 25 parts butyl myristate / 25 parts N-dibutyl palmitamide | 60 |
| 32 | 25 parts ethylene glycol dilaurate / 25 parts N-dibutyl lauramide | 56 |
| | 25 parts butyl laurate / 25 parts N-dibutyl stearamide | 57 |
| | 25 parts butyl stearate / 25 parts N-dibutyl palmitamide | 45 |

Sheets prepared according to this invention can be used as interlayers in safety glass, the incorporation being effected with or without the use of adhesives. A preferred method of producing a sheet of safety glass consists in assembling the sheets of glass and interlayers and then pressing them gently to expel air between the sheets. They are then laminated under heat and pressure by means of a diaphragm press to which heat is applied. The pressing is finally completed by the hydraulic method, the resulting sheet being placed in an autoclave and exposed to a pressure of about 10 atmospheres and to a temperature from 100° to 150° C.

Safety glass sheets in which films of the plastic composition of the present invention are incorporated show improved resistance in impact or shattering tests at low temperatures. In conducting such tests, metal balls of various weights and sheets of the glass, 12 inches square, are used. The height from which a ball of a definite standard weight can be dropped without shattering the glass, which is maintained at a standard temperature, is determined. A sheet made with nitrocellulose at −10° F. (−23° C.) barely withstands the impact of a 0.5-pound ball dropped from a height of 3 feet, whereas a sheet of glass made with an interlayer of "Butvar" prepared and plasticized according to the procedure described in Example 1 withstands an impact of a 0.5-pound ball dropped from heights of over 18 feet at room temperature.

In comparative "balanced" break tests, the glass is subjected to impacts of metal balls dropped from various heights at two different temperatures, 0° F. and 120° F. When the glass withstands the same impact at the two temperatures the break is said to be balanced. The best commercial safety glass sandwich made with a plastic interlayer of 0.015 inch thickness and plate glass of about 0.100 inch thickness will withstand the impact of a 0.5-pound ball dropped from a height of at least 18 feet at both 0° F. and 120° F. The break strengths of safety glasses made with interlayers of "Butvar" resin plasticized with the plasticizer mixture of the present invention and some comparison samples tested in "balanced" break tests are as follows:

| Parts | Plasticizer per 100 parts "Butvar" resin | Break strength (0.5-pound ball in feet) | |
|---|---|---|---|
| | | 0° F. | 120° F. |
| | | Feet | Feet |
| 25 | Butyl stearate | 19 | 19 |
| 25 | N-dibutyl lauramide | | |
| 40 | Dibutyl sebacate | 21 | 21 |
| 43 | Triethylene glycol dihexoate | 20 | 20 |

The adhesion of safety glass is tested by cooling a lamination or sandwich thereof to 0° F. and then pounding the sandwich on an anvil until the glass is completely pulverized. No bare spots of plastic should be observed when the broken fragments are removed by shaking the shattered lamination. The adhesion observed on laminations made with a "Butvar" sheet plasticized with a mixture of butyl stearate and N-dibutyl lauramide according to the present invention were satisfactory in comparison with the best commercial safety glasses and comparable to the best results obtained with sheets of "Butvar" resin plasticized with dibutyl sebacate and "Butvar" sheets plasticized with triethylene glycol dihexoate.

Inasmuch as the foregoing description comprises preferred embodiments of the invention it is to be understood that the invention is not restricted thereto and that changes and modifications may be made therein without departing substantially from the invention, which is defined in the appended claims.

I claim:

1. A plastic composition of matter comprising a polyvinyl acetal resin and embodying, as a modifying agent therefor, a mixture of two plasticizers, one of which is an alkylamide primary plasticizer selected from the group consisting of (1) Alkylamides having the general formula

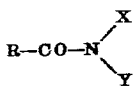

in which R represents an alkyl group containing from 5 to 17 carbon atoms, and X and Y represent alkyl groups having from 1 to 18 carbon atoms;

(2) N-cyclohexyl alkylamides having the general formula

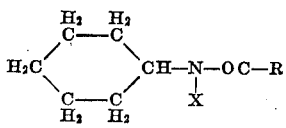

in which X represents an alkyl group having from 1 to 18 carbon atoms and R represents an alkyl group containing from 5 to 17 carbon atoms, (3) N-acyl morpholines having the general formula

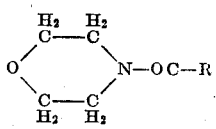

in which R represents an alkyl group containing from 5 to 17 carbon atoms, (4) N-acyl piperidines having the general formula

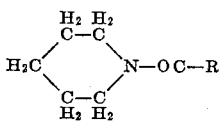

in which R represents an alkyl group containing from 5 to 17 carbon atoms, (5) N-acyl-N'-acyl piperazines having the general formula

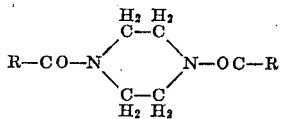

in which R represents an alkyl group containing from 5 to 17 carbon atoms, and (6) N-polyalkyl-substituted polyamido alkenes having the general formula

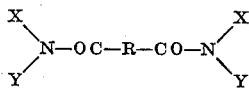

in which R is an alkyklene group containing from 5 to 17 carbon atoms and X and Y are alkyl groups containing from 1 to 18 carbon atoms, and the other of which is an alkyl ester of a carboxylic acid auxiliary plasticizer selected from the group consisting of (1) Alkyl esters of monocarboxylic acids having the general formula

in which X represents an alkyl radical containing from 1 to 18 carbon atoms and Y represents an alkyl radical containing from 11 to 17 carbon atoms, and (2) Alkyl esters of polycarboxylic acids having the general formula

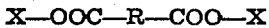

in which R is alkylene radical containing from 2 to 17 carbon atoms and X represents an alkyl radical containing from 4 to 18 carbon atoms, said plasticizers being present in the plasticizer mixture in the proportions of approximately 20 to 80 parts of the alkyl ester, and the mixture of plasticizers being present in the vinyl acetal resin in a proportion corresponding to from approximately 20 to 150 parts by weight of the mixed plasticizer to 100 parts by weight of the resin.

2. A plastic composition of matter comprising a polyvinyl acetal resin and embodying, as a modifying agent therefor, a mixture of two plasticizers, one of which is a primary plasticizer consisting of an alkylamide, said primary plasticizer having the general formula

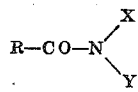

in which R represents an alkyl group containing from 5 to 17 carbon atoms, and X and Y represent alkyl groups having from 1 to 18 carbon atoms, said plasticizer when used alone being compatible with the resin in the proportion of 50 parts by weight of plasticizer to 100 parts by weight of resin, and the other of which is an alkyl ester of a carboxylic acid auxiliary plasticizer having the general formula

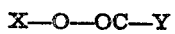

in which X represents an alkyl radical containing from 1 to 18 carbon atoms and Y represents an alkyl group containing from 11 to 17 carbon atoms, said plasticizer when used alone being incompatible with the resin in the proportion of 50 parts by weight of the plasticizer to 100 parts by weight of resin, said plasticizers being present in such proportions in the mixture that the resulting plasticizer mixture is compatible with the resin and the plasticizer mixture is present in the resin in a proportion of at least 20 and less than 150 parts by weight to 100 parts by weight of the resin.

3. A plastic composition of matter comprising a polyvinyl acetal resin and embodying, as a modifying agent therefor, a mixture of two plasticizers, one of which is a primary plasticizer consisting of an alkylamide, said primary plasticizer having the general formula

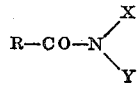

in which R represents an alkyl group containing from 5 to 17 carbon atoms, and X and Y represent alkyl groups having from 1 to 18 carbon atoms, said plasticizer when used alone being compatible with the resin in the proportion of 50 parts by weight of the plasticizer to 100 parts by weight of resin, and the other of which is an alkyl ester of a carboxylic acid auxiliary plasticizer having the general formula

in which X represents an alkyl radical containing from 1 to 18 carbon atoms and Y represents an alkyl group containing from 11 to 17 carbon atoms, said plasticizer when used alone being incompatible with the resin in the proportion of 50 parts by weight of the plasticizer to 100 parts by weight of resin, said plasticizers being present in such proportions in the mixture that the resulting plasticizer mixture is compatible with the resin and the flexibility of the resulting plastic composition at $-20°$ F. is greater than would result from the use of an amount of the alkylamide plasticizer corresponding to the combined amount of mixed plasticizers.

4. A plastic composition of matter comprising a polyvinyl acetal resin and embodying, as a modifying agent therefor, a mixture of two plasticizers, one of which is an alkylamide primary plasticizer having the general formula

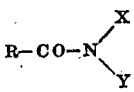

in which R represents an alkyl group containing from 5 to 17 carbon atoms, and X and Y represent alkyl groups having from 1 to 18 carbon atoms, and the other of which is an alkyl ester of a carboxylic acid auxiliary plasticizer having the general formula

in which X represents an alkyl radical containing from 1 to 18 carbon atoms and Y represents an alkyl group containing from 11 to 17 carbon atoms, said plasticizers being present in the plasticizer mixture in the proportions of approximately 20 to 80 parts of the alkylamide to approximately 80 to 20 parts of the alkyl ester, and the mixture of plasticizers being present in the vinyl acetal resin in a proportion corresponding to from approximately 20 to 150 parts by weight of the mixed plasticizer to 100 parts by weight of the resin.

5. A plastic composition of matter comprising a polyvinyl acetal resin and embodying, as a modifying agent therefor, a mixture of two plasticizers, one of which is an alkylamide primary plasticizer having the general formula

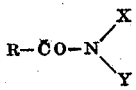

in which R represents an alkyl group having from 11 to 17 carbon atoms, and X and Y represent alkyl groups having from 4 to 8 carbon atoms, and the other of which is an alkyl ester of a carboxylic acid auxiliary plasticizer having the general formula

in which X represents an alkyl radical containing from 2 to 8 carbon atoms and Y represents an alkyl group containing from 11 to 17 carbon atoms, said plasticizers being present in the plasticizer mixture in the proportions of approximately 40 to 60 parts of the alkylamide to approximately 60 to 40 parts of the alkyl ester and the mixture of plasticizers being present in the vinyl acetal resin in a proportion corresponding to from approximately 40 to 100 parts by weight of the mixed plasticizer to 100 parts by weight of the resin.

6. A plastic composition of matter comprising a polyvinyl acetal resin and embodying, as a modifying agent therefor, a mixture of two plasticizers, one of which is N-dibutyl lauramide and the other of which is butyl stearate, said plasticizers being present in the resin in the proportions of approximately 20 to 40 parts by weight of N-dibutyl lauramide and approximately 10 to 30 parts by weight of butyl stearate to 100 parts by weight of the resin.

7. A plastic composition of matter comprising a polyvinyl acetal resin and embodying, as a modifying agent therefor, a mixture of two plasticizers, one of which is N-dibutyl lauramide and the other of which is ethyl stearate, said plasticizers being present in the resin in the proportions of approximately 20 to 40 parts by weight of N-dibutyl lauramide and approximately 10 to 30 parts by weight of ethyl stearate to 100 parts by weight of the resin.

8. A plastic composition of matter comprising a polyvinyl acetal resin and embodying, as a modifying agent therefor, a mixture of two plasticizers, one of which is N-dibutyl lauramide and the other of which is butyl palmitate, said plasticizers being present in the resin in the proportions of approximately 20 to 40 parts by weight of N-dibutyl lauramide and approximately 10 to 30 parts by weight of butyl palmitate to 100 parts by weight of the resin.

9. A plastic composition of matter comprising a polyvinyl butyraldehyde acetal resin and embodying, as a modifying agent therefor, a mixture of two plasticizers, one of which is N-dibutyl lauramide and the other of which is butyl stearate, said plasticizers being present in the resin in the proportions of approximately 20 to 40 parts by weight of N-dibutyl lauramide and approximately 10 to 30 parts by weight of butyl stearate to 100 parts by weight of the resin.

10. A plastic composition of matter comprising a polyvinyl butyraldehyde acetal resin and embodying, as a modifying agent therefor, a mixture of two plasticizers, one of which is N-dibutyl lauramide and the other of which is ethyl stearate, said plasticizers being present in the resin in the proportions of approximately 20 to 40 parts by weight of N-dibutyl lauramide and approximately 10 to 30 parts by weight of ethyl stearate to 100 parts by weight of the resin.

11. A plastic composition of matter comprising a polyvinyl butyraldehyde acetal resin and embodying, as a modifying agent therefor, a mixture of two plasticizers, one of which is N-dibutyl lauramide and the other of which is butyl palmitate, said plasticizers being present in the resin in the proportions of approximately 20 to 40 parts by weight of N-dibutyl lauramide and approximately 10 to 30 parts by weight of butyl palmitate to 100 parts by weight of the resin.

12. A plastic interlayer film for safety glass formed of a plastic composition as defined in claim 1.

13. A plastic interlayer film for safety glass formed of a plastic composition as defined in claim 5.

14. A plastic interlayer film for safety glass formed of a plastic composition as defined in claim 9.

JOHN K. CRAVER.

CERTIFICATE OF CORRECTION.

Patent No. 2,339,056. January 11, 1944.

JOHN K. CRAVER.

It is hereby certified that error appears in the printed specification of the above numbered patent requiring correction as follows: Page 3, second column, line 61, for "15 and 8" read --15 and 18--; and that the said Letters Patent should be read with this correction therein that the same may conform to the record of the case in the Patent Office.

Signed and sealed this 25th day of April, A. D. 1944.

Leslie Frazer

(Seal) Acting Commissioner of Patents.